United States Patent
Kouda

(10) Patent No.: US 7,812,498 B2
(45) Date of Patent: Oct. 12, 2010

(54) STATOR OF ELECTRIC ROTATING MACHINE AND ELECTRIC ROTATING MACHINE

(75) Inventor: Shinji Kouda, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/427,165

(22) Filed: Apr. 21, 2009

(65) Prior Publication Data

US 2009/0261686 A1 Oct. 22, 2009

(30) Foreign Application Priority Data

Apr. 21, 2008 (JP) .............................. 2008-110789

(51) Int. Cl.
*H02K 3/04* (2006.01)
*H02K 3/12* (2006.01)
*H02K 3/34* (2006.01)

(52) U.S. Cl. ........................................ 310/201; 310/207

(58) Field of Classification Search ................. 310/180, 310/184, 201, 203, 206, 207
See application file for complete search history.

(56) References Cited

U.S. PATENT DOCUMENTS

| 4,833,356 A * | 5/1989 | Bansal et al. ............... 310/207 |
|---|---|---|
| 6,930,425 B2 * | 8/2005 | Kato .......................... 310/201 |
| 6,979,926 B2 * | 12/2005 | Ogawa et al. ................ 310/180 |
| 7,143,506 B2 * | 12/2006 | Ooiwa .......................... 29/606 |
| 2005/0046299 A1 * | 3/2005 | Brown et al. ................. 310/207 |

FOREIGN PATENT DOCUMENTS

| JP | H01-093937 | | 6/1989 |
|---|---|---|---|
| JP | 2005210761 A | * | 8/2005 |
| JP | 2005253294 A | * | 9/2005 |
| JP | 2009033831 A | * | 2/2009 |
| WO | WO 2008/108351 | | 9/2008 |

OTHER PUBLICATIONS

Japanese Office Action dated Jan. 5, 2010, issued in corresponding Japanese Application No. 2008-110789, with English translation.

* cited by examiner

*Primary Examiner*—Tran N Nguyen
(74) *Attorney, Agent, or Firm*—Nixon & Vanderhye PC

(57) ABSTRACT

The stator of an electric rotating machine includes a stator core having slots formed therein along a circumferential direction thereof, and a stator winding formed by conductive wires wound on the slots. The stator winding includes in-slot portions accommodated in the slots and turn portions each of which connects each adjacent two of the in-slot portions outside of the slots. Each of the turn portions includes a first turn portion formed with M1 steps (m1 being a positive integer) extending along axial ends of the stator core, and a second turn portion formed with m2 steps (m2 being an integer larger than m1) extending along the axial ends.

16 Claims, 6 Drawing Sheets

STATOR OF ELECTRIC ROTATING MACHINE AND ELECTRIC ROTATING MACHINE

CROSS-REFERENCE TO RELATED APPLICATION

This application is related to Japanese Patent Application No. 2008-110789 filed on Apr. 21, 2008, the contents of which are hereby incorporated by reference.

BACKGROUND OF THE INVENTION

1. Field of the Invention

The present invention relates to a stator of an electric rotating machine, and an electric rotating machine having the stator.

2. Description of Related Art

In recent years, there is a growing need of electric rotating machines usable as electric motors or generators which are compact in size and of high quality.

For example, an electric rotating machine mounted on a vehicle is required to generate more output power because of increase of vehicle loads, although the space assigned to mount the electric rotating machine in an engine compartment is becoming smaller.

To meet the requirement, it is necessary to reduce the resistance of the phase windings of an electric rotating machine, increase the lamination factor of the electric conductors accommodated in the magnetic circuit of the stator of the electric rotating machine, and properly align and densify the turn portions of the phase windings.

There has been developed an electric rotating machine satisfying the above requirement which includes a stator having a stator core formed with slots along the circumferential direction thereof, a stator winding constituted by conductive wires wound on the slots, the stator winding including in-slot portions accommodated in the slots and turn portions each of which connects each adjacent two of the in-slot portions to each other. In this electric rotating machine, each turn portion is formed with a step portion extending in the direction parallel to the axial ends of the stator core, in order to increase the arranging density of the turn portions and to reduce the projection height of the turn portions from the stator core.

However, the electric rotating machine having such a structure has a problem in that a coolant such as ATF for cooling the stator does not sufficiently penetrate into the turn portions, causing the stator winding to be insufficiently cooled.

SUMMARY OF THE INVENTION

The present invention provides a stator of an electric rotating machine comprising:

a stator core having slots formed therein along a circumferential direction thereof; and a stator winding formed by conductive wires wound on the slots;

the stator winding including in-slot portions accommodated in the slots and turn portions each of which connects each adjacent two of the in-slot portions outside of the slots, each of the turn portions including a first turn portion formed with m1 steps (m1 being a positive integer) extending along axial ends of the stator core, and a second turn portion formed with m2 steps (m2 being an integer larger than m1) extending along the axial ends.

The present invention also provides an electric rotating machine comprising the stator as described above, and a rotor having magnetic poles at a periphery thereof facing an inner or outer periphery of the stator, the magnetic poles being formed such that N-poles and S-poles alternate in a circumferential direction of the rotor.

According to the present invention, there is provided a stator of an electric rotating machine and an electric rotating machine having a stator, which have excellent performance in cooling the turn portions of the stator, and accordingly, have less performance degradation due to overheat of the turn portions.

Other advantages and features of the invention will become apparent from the following description including the drawings and claims.

PREFERRED EMBODIMENTS OF THE INVENTION

Figure 1:
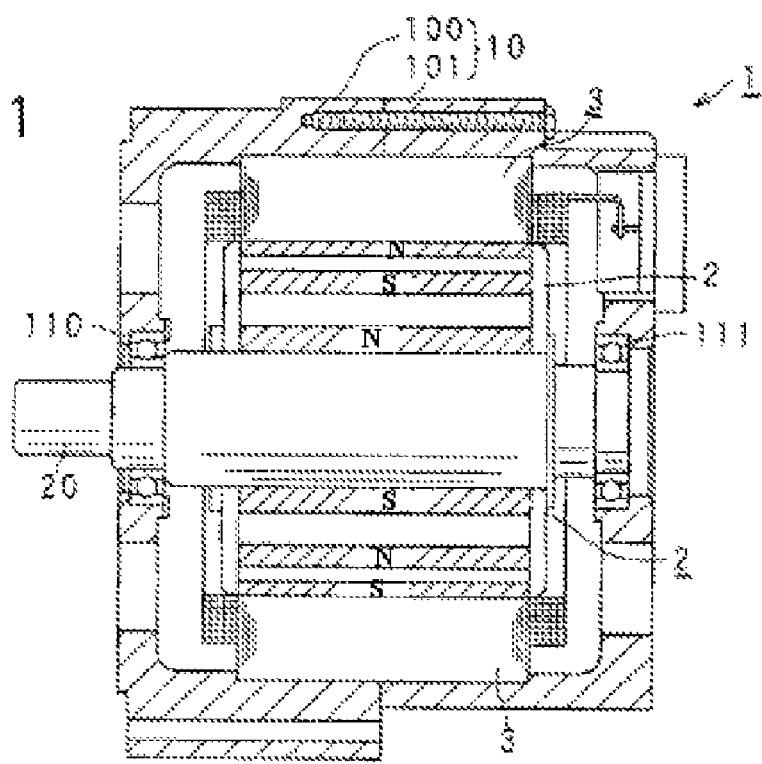
FIG. 1 is a diagram showing a structure of an electric rotating machine of an embodiment of the invention.

FIG. is a diagram showing a structure of an electric rotating machine 1 according to an embodiment of the invention. As shown in this figure, the electric rotating machine 1 includes a housing 10 constituted by a pair of housing members 100 and 101 each having a bottomed tubular shape and joined to each other at their opening portions, a rotor 2 fixed to a rotating shaft 20 rotatably supported by the housing 10 through bearings 110 and 111, and a stator 3 fixed to the housing 10 so as to surround the rotor 2 inside the housing 10.

The rotor 2 is provided with a plurality of magnet poles (S poles and N poles) formed in the outer periphery of the rotor 2 facing the inner periphery of the stator 3, such that different poles alternate in the circumferential direction of the rotor 2. In this embodiment, an 8-pole (four N poles and four S poles) rotor is used as the rotor 2.

Figure 2:
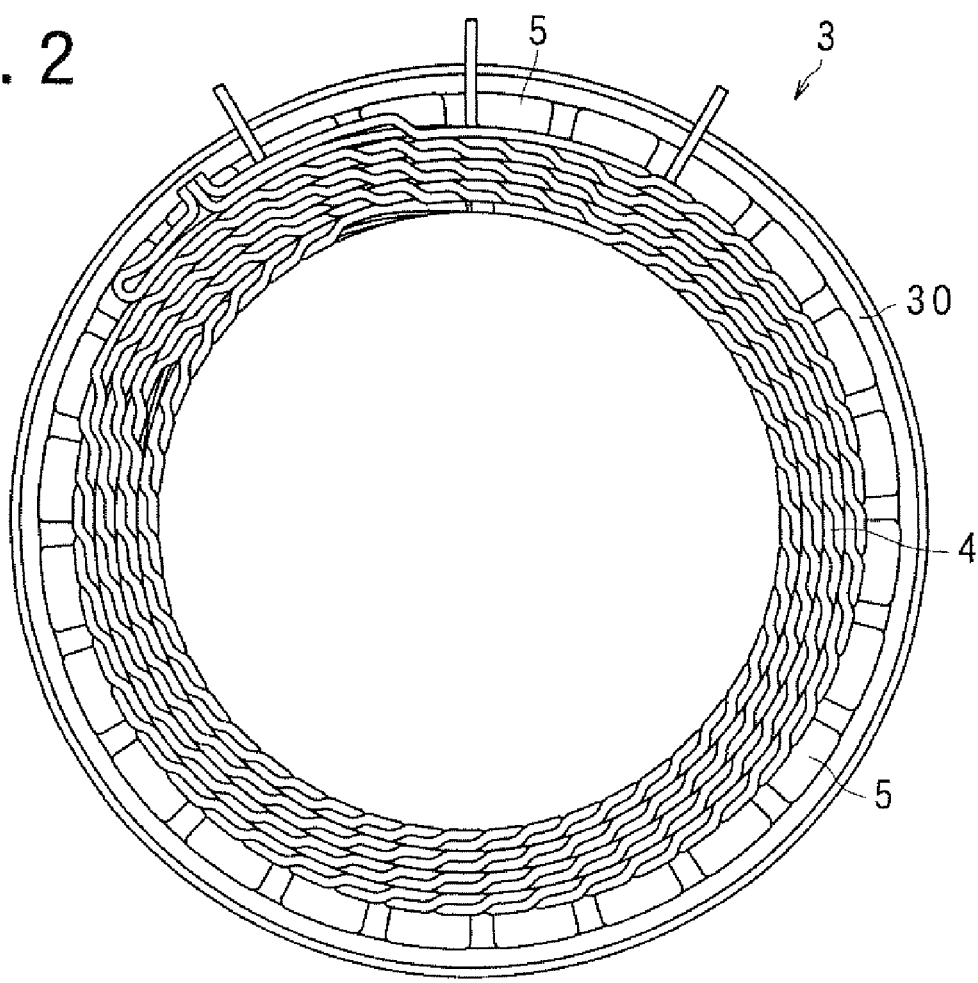
FIG. 2 is a front view of a stator of the electric rotating machine of the embodiment.

As shown in FIG. 2, the stator 3 includes a stator core 30, a three-phase stator winding 4 constituted by a plurality of phase windings, and insulating paper 5 interposed between the stator core 30 and the stator winding 4.

Figure 3:
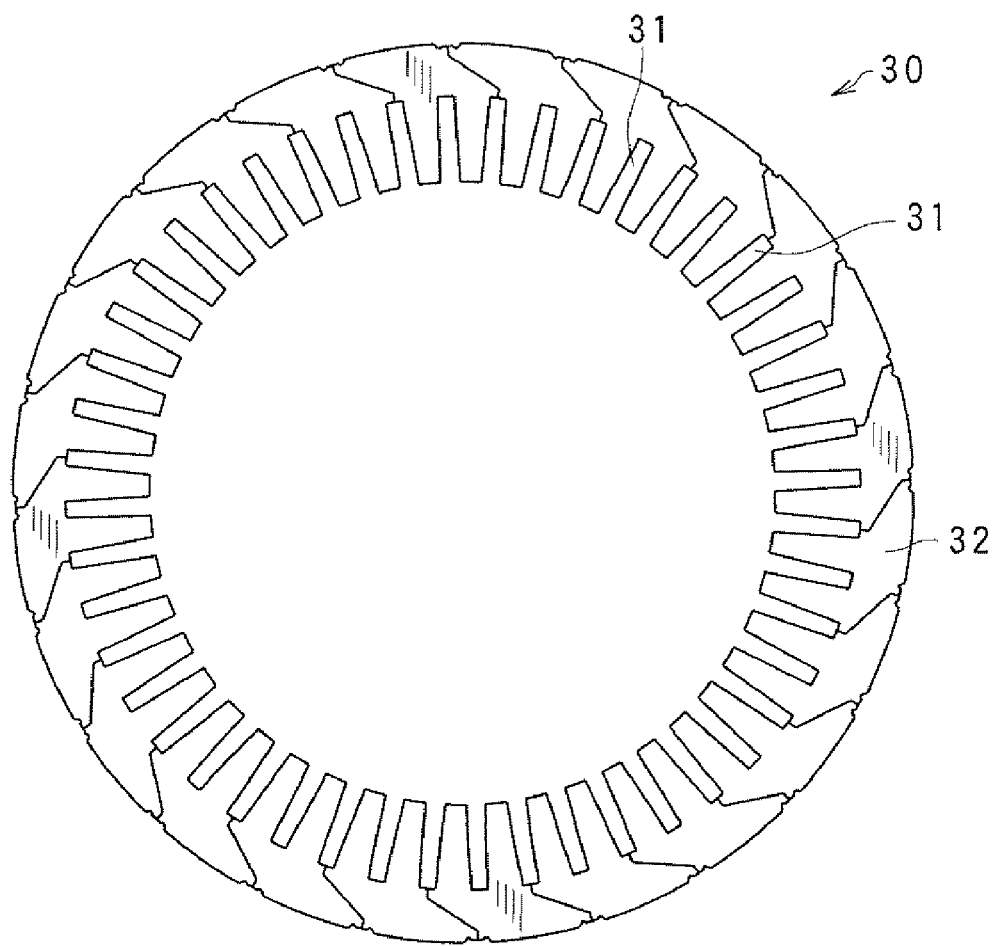
FIG. 3 is a front view of a stator core of the stator of the electric rotating machine of the embodiment.

As shown in FIG. 3, the stator core 30 has a shape of a circular ring formed with slots 31 at its inner periphery. The depth directions of the respective slots 31 coincide with the radial direction of the stator core 30. The stator core 30 is formed with two slots 31 for each pole of the stator 2 for each one of the three phases. That is, the stator core is formed with 48 (=8×3×2) slots 31 in total.

Figure 4:
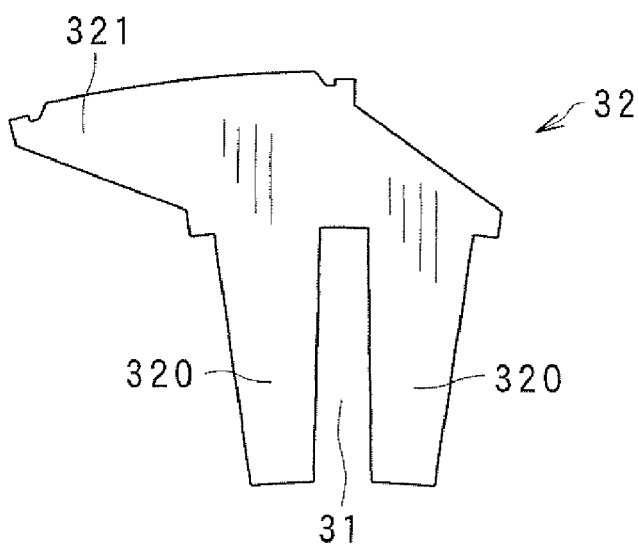
FIG. 4 is a diagram showing one of divided cores constituting the stator core shown in FIG. 3.

The stator core 30 is constituted by 24 divided cores (core pieces) 32 shown in FIG. 4, which are arranged in a ring. The divided core 32 includes two tooth portions 320 which extend radially inwardly to define one of the slots 31 and define another one of the slots 31 with each of the circumferentially adjacent divided cores 32, and a back core portion 321 integrally connecting the tooth portions 320.

The stator core 30 constituted by the divided cores 32 is formed by laminating four hundred and ten electromagnetic steel plates having a thickness of 0.3 mm, while interposing an insulating thin film between each of the electromagnetic steel plates. The stator core 30 may be formed by laminating metal thin plates other than electromagnetic steel plates, while interposing an insulating thin film between each of the metal thin plates, as conventionally.

Figure 5A:
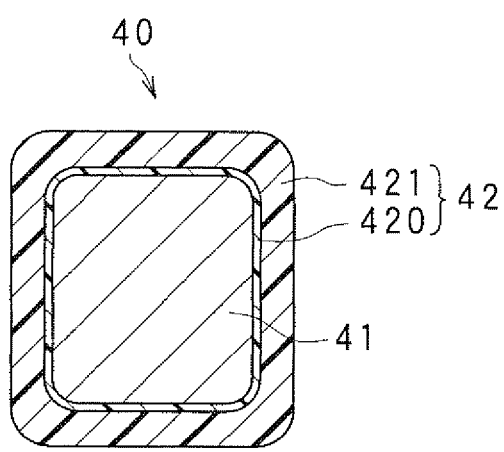
FIGS. 5A and 5B are diagrams showing cross sections of phase windings constituting a stator winding of the electric rotating machine of the embodiment.

The stator winding 4 is constituted by a plurality of windings 40 made of conductive wires wound together in a given way. As shown in FIG. 5A, each of the windings 40 includes a conductor 41 made of aluminum or copper and an insulating film 42 constituted by an inner layer 420 and an outer layer 421 covering the outer surface of the conductor 41. The thickness of the insulating film 42 is between 100 μm and 200 μm. Since the insulating film 42 is sufficiently thick, it is not necessary to interpose insulating paper or the like between each of the windings 40 for insulation therebetween. However, insulating paper 5 may be interposed between each of the windings 40 in the same way shown in FIG. 2.

Figure 5B:
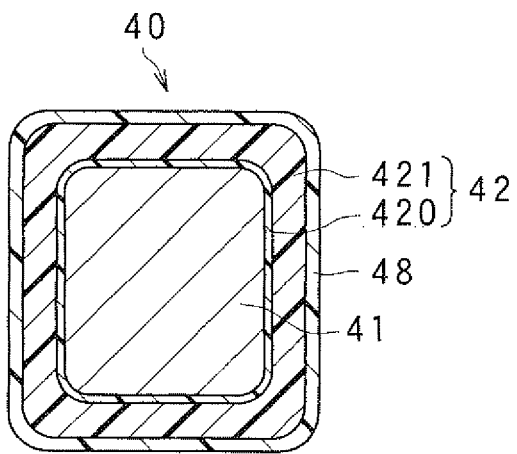

As shown in FIG. 5B, the outer surface of the insulating film 42 of the winding 40 may be coated with a fusion member 48 made of fusion material such as epoxy resin. The fusion member 48 melts at an earlier time than the insulating film 42 when the electric rotating machine 1 generates heat, and accordingly, windings 40 accommodated in the same slot 31 heat-adhere to one another through their fusion members 48. As a result, since the windings 40 accommodated in the same slot 31 become integrated and rigid, the mechanical strength of the windings 40 increases.

Figure 6:
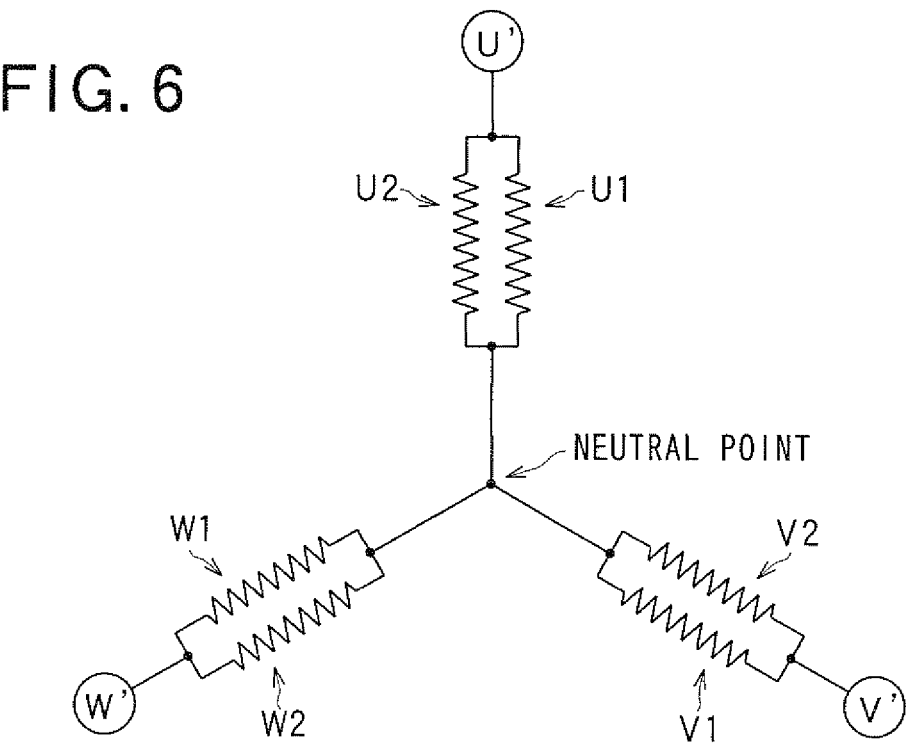
FIG. 6 is a diagram showing electrical connection of the phase windings of the stator winding of the electric rotating machine of the embodiment.

In this embodiment, as shown in FIG. 6, the stator winding 4 is constituted by two sets of three-phase windings (phase windings U1, U2, V1, V2, W1 and W2).

Figure 7:
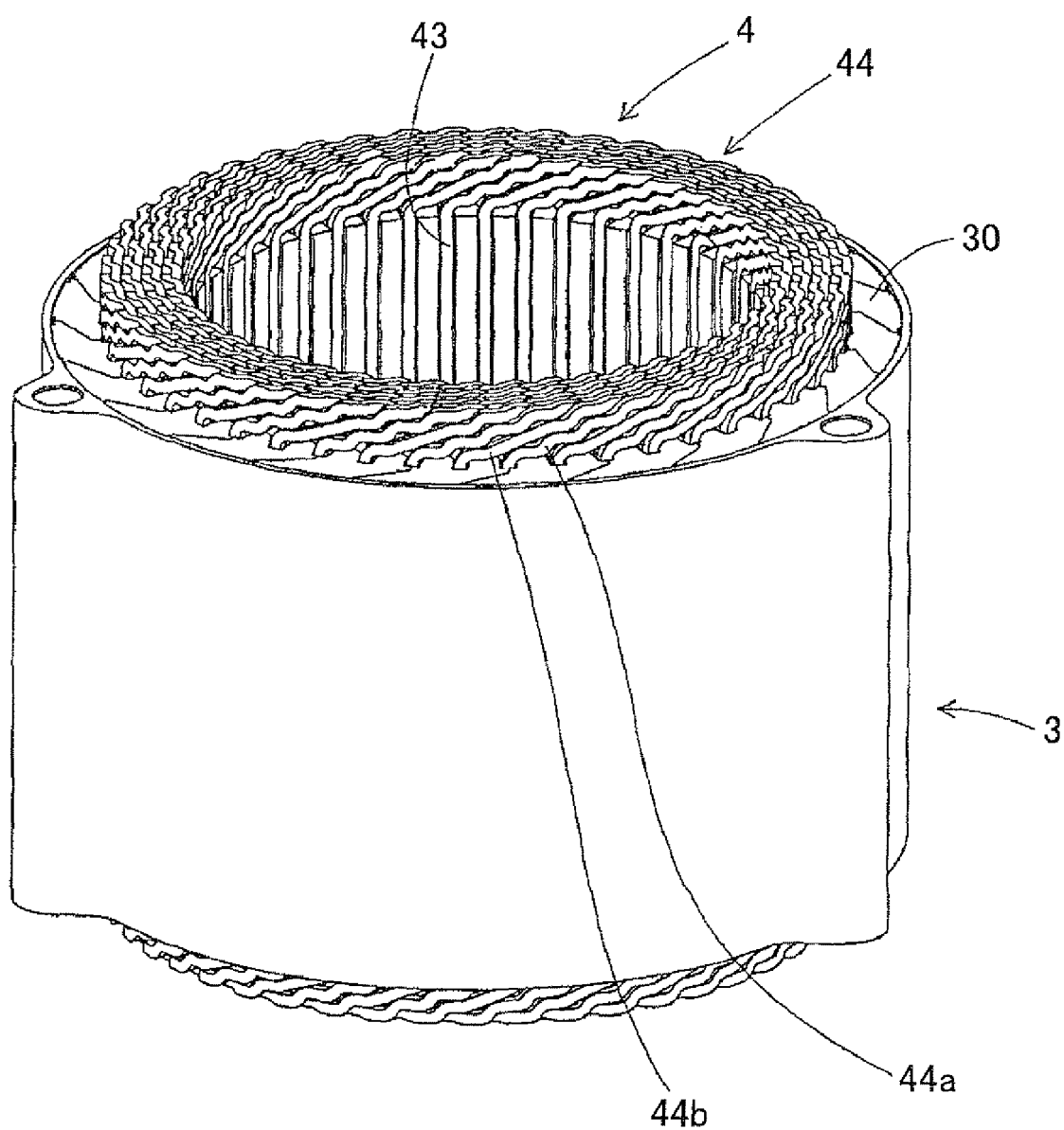
FIG. 7 is a perspective view of the stator of the electric rotating machine of the embodiment.
Figures 8, 9:
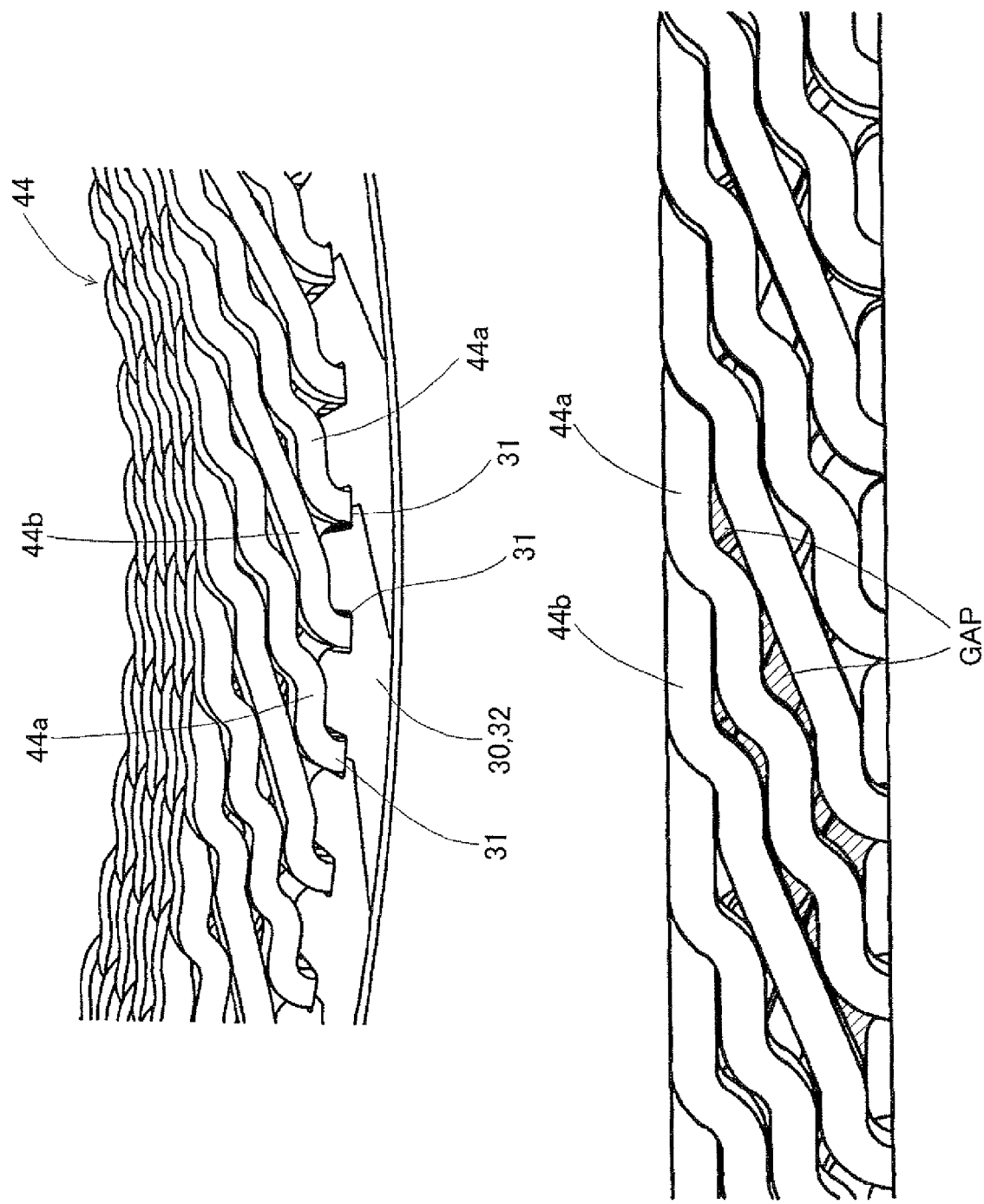
FIG. 8 is a partially enlarged view of the stator of the electric rotating machine of the embodiment.
FIG. 9 is a partially enlarged view of a side surface of the stator of the electric rotating machine of the embodiment.

As shown in FIGS. 7 to 9, the stator winding 4 is constituted by the windings 40 wound together in a predetermined shape. Each of the windings 40 is wave-wound along the circumferential direction on the side of the inner periphery of the stator core 30. Each of the windings 40 includes in-slot portions 43 of a linear shape accommodated in the slots 31, and turn portions 44 each connecting the adjacent in-slot portions 43 to each other. The in-slot portions 43 of the same winding 40 are accommodated in every predetermined number of the slots 31 (every six slots 31 in this embodiment). The turn portions 44 project from the axial ends of the stator core 30.

Each of the windings 40 is wave-wound along the circumferential direction with one end thereof being projected from the axial ends of the stator core 30. One phase winding of the stator winding 4 is constituted by two of the windings 40 (may be referred to as a first winding 40a and second winding 40b hereinafter) wave-wound along the circumferential direction and connected to each other at other ends thereof. The first winding 40a and the second winding 40b are wound on the same slots 31. The in-slot portions 43 of the first winding 40a and the in-slot portions 43 of the second winding 40b are accommodated such that they alternate in the depth direction in the slots.

As explained above, the stator winding 40 is constituted by 2 sets of three-phase windings (phase windings U1, U2, V1, V2, W1 and W2) each of which is constituted by the first and second windings 40a and 40b. That is, the stator winding 40 is constituted by 12 windings 40.

In this embodiment, the stator winding 40 is formed by winding each series connection of the first and second windings 40a and 40b four turns in the circumferential direction. That is, the stator winding 40 is constituted by 6 series connection of the first and second windings 40a and 40b which are overlapped in four layers in the radial direction. Accordingly, each of the slots 31 accommodates 8 (=4×2) in-slot portions. Each series connection of the first and second windings 40a and 40b is wound such that both ends thereof are located on the side of the outermost layer, and the connecting portion between the first and second windings 40a and 40b is located on the side of the innermost layer.

The turn portions 44 of the stator winding 4 are located on the sides of both axial ends of the stator core 30.

Each turn portion 44 has a stair-like shape including a step portion extending in the direction parallel to the axial ends of the stator core 30. In more detail, each turn portion 44 is constituted by a first turn portion 44a having three steps in the axial direction, and a second turn portion 44b having two steps in the axial direction.

The height of each of the three steps of the first turn portion 44a is approximately equal to the width of the winding 40. The lengths of the steps along the axial ends of the stator core are shorter than the distance between circumferentially adjacent two of the slots 31.

The first turn portion 44a includes a crank portion formed at a position most distant from the stator core 30 so as to have a crank-like shape in the circumferential direction. The crank portion extends in the direction parallel to the axial ends of the stator core 30. The radial height of the crank portion is equal to the width of the conductive wire.

The height between the two steps of the second turn portion 44b is approximately equal to twice the width of the winding 40. A portion between the two steps of the second turn portion 44b extends obliquely such that the winding 40 connects the two steps to each other.

Like the first turn portion 44a, the second turn portion 44b includes a crank portion formed at a position most distant from the stator core 30 so as to have a crank-like shape in the circumferential direction. The crank portion extends in the direction parallel to the axial ends of the stator core 30.

Each of the first and second turn portions 44a and 44b has a shape symmetrical with respect to the crank portion.

The first and the second turn portions 44a and 44b project respectively from the circumferentially adjacent slots. This makes it unnecessary to increase the height of the stator winding ends projecting from the axial ends of the stator core 30, or increase the radial width of the stator winding ends. Accordingly, according to this embodiment, it is possible to prevent the stator winding 4 from overhanging radially outwardly, because the height and the radial width of the stator winding ends are small.

As shown in FIGS. 8 and 9, there is a gap between the first and the second turn portions 44a and 44b because of the difference in shape between them.

The coolant flows in the housing 10 of the electric rotating machine 1. Since the coolant passes through the gap between the first and second turn portions 44a and 44b, the turn portions 44 (coil end) can be cooled to the inside thereof.

The stator winding 4 is constituted by 6 sets of winding assemblies for each of 6 phases (U1, U2, V1, V2, W1 and W2), each of the winding assemblies having two windings 40 wound in the opposite directions and having the in-slot portions 43 and turn portions 44 which alternate in the circumferential direction. The ends of these two windings 40 other than the end on the side of the neutral point or the end on the side of the phase terminal are connected to each other by one of the in-slot portions 43.

The stator winding 4 is manufactured by fabricating, for each of the 6 phases, the winding assembly constituted by two windings 40 wound in the opposite directions and each having the in-slot portions 43 and turn portions 44 which alternate in the circumferential direction, and then winding the winding assembly by a predetermined number of turns (four turns, for example). The manufactured stator winding 4 has a shape in which the in-slot portions 43 of the windings 40 of the respective phases are arranged at a small gap in the circumferential direction.

In this embodiment, each winding 40 is wound such that each first turn portion 44a thereof adjoins the second turn portion 44b of different winding 40. Since the first turn portion 44a and the second turn portion 44b have different number of steps so that they have different shapes, a gap is formed therebetween.

When the number of phases of the electric rotating machine is k, and the number of the slots 31 per one of magnetic poles of each phase of the rotor of the electric rotating machine is n (n being an even number), the number of gaps formed between the first and second turn portions adjacent to each other is (k×n)/2 per one of the slots 31.

The coolant can pass through the gap, and accordingly, the turn portions 44 (coil end) can be sufficiently cooled. Hence, the electric rotating machine 1 of this embodiment has excellent performance in cooling the turn portions 44 (coil end), and accordingly, has less performance degradation due to overheating of the turn portions 44.

It should be noted that the above advantage of the embodiment can be obtained only by making difference in the number of steps between the first and second turn portions 44a and 44b, without increasing the projection height of the turn portions 44 projecting from the stator core 30. Hence, according to this embodiment of the invention, it is possible to provide a compact high-output electric rotating machine.

The above explained preferred embodiments are exemplary of the invention of the present application which is described solely by the claims appended below. It should be understood that modifications of the preferred embodiments may be made as would occur to one of skill in the art.

What is claimed is:

1. A stator of an electric rotating machine comprising:
    a stator core having slots formed therein along a circumferential direction thereof; and
    a stator winding formed by conductive wires wound on said slots;
    said stator winding including in-slot portions accommodated in said slots and turn portions wherein each of said turn portions connects each corresponding adjacent two of said in-slot portions outside of said slots,
    said turn portions being constituted by first turn portions, each formed with m1 steps, where m1 being a positive integer, extending along axial ends of said stator core, and second turn portions, each formed with m2 steps, where m2 being an integer larger than said m1, extending along said axial ends.

2. The stator according to claim 1, wherein lengths of said steps of said first and second turn portions along said axial ends are shorter than a distance between circumferentially adjacent two of said slots.

3. The stator according to claim 1, wherein each of said turn portions has a staircase shape with steps extending along said axial ends.

4. The stator according to claim 3, wherein lengths of said steps along said axial ends are shorter than a distance between circumferentially adjacent two of said slots.

5. The stator according to claim 1, wherein when a number of phases of said electric rotating machine is k, and the number of said slots per one of magnetic poles of each phase of a rotor of said electric rotating machine formed such that S-poles and N-poles alternate in a circumferential direction of said rotor is n, where n being an even number, and a number of gaps formed between said first and second turn portions adjacent to each other is (k×n)/2 per one of said slots.

6. The stator according to claim 1, wherein each of said turn portions has a crank portion having a crank-like shape at a position most distant from said stator core.

7. The stator according to claim 6, wherein said crank portion is parallel to said axial ends.

8. The stator according to claim 6, wherein a radial height of said crank portion is equal to a width of said conductive wire.

9. The stator according to claim 1, wherein each of said turn portions is located so as to overlap with an adjacent one of said turn portions in said axial direction.

10. The stator according to claim 1, wherein each of said conductive wires has a rectangular cross-section.

11. The stator according to claim 1, wherein each of said conductive wires is wound along an entire circumference of said stator core.

12. The stator according to claim 1, wherein each of said conductive wires includes a conductor and an insulating film covering an outer surface of said conductor, said insulating film having a thickness of 100-200 μm.

13. The stator according to claim 12, wherein said insulating film is constituted by an inner layer and an outer layer, a glass transition temperature of said outer layer being lower than that of said inner layer.

14. The stator according to claim 12, wherein each of said wire conductors further includes a fusion member covering an outer surface of said insulating film.

15. The stator according to claim 12, wherein said conductor is made of aluminum.

16. An electric rotating machine comprising a stator as recited in claim 1, and a rotor having magnetic poles at a periphery thereof facing an inner or outer periphery of said stator, said magnetic poles being formed such that N-poles and S-poles alternate in a circumferential direction of said rotor.

* * * * *